United States Patent
Wang

(10) Patent No.: US 7,225,847 B2
(45) Date of Patent: Jun. 5, 2007

(54) LAMINATED PRODUCT AUTOMATIC TRANSPORTING AND FEEDING DEVICE FOR LAMINATOR

(75) Inventor: Tie Chun Wang, San Chung (TW)

(73) Assignee: Michilin Prosperity Co., Ltd., Taipei Hsien (TW)

( * ) Notice: Subject to any disclaimer, the term of this patent is extended or adjusted under 35 U.S.C. 154(b) by 0 days.

(21) Appl. No.: 11/037,203

(22) Filed: Jan. 19, 2005

(65) Prior Publication Data

US 2006/0157203 A1 Jul. 20, 2006

(51) Int. Cl.
*B32B 37/00* (2006.01)
(52) U.S. Cl. .................. 156/538; 156/552; 156/555; 156/582
(58) Field of Classification Search .......... 156/538, 156/552, 555, 580, 582, 583.1
See application file for complete search history.

(56) References Cited

U.S. PATENT DOCUMENTS

| | | | | | |
|---|---|---|---|---|---|
| 3,623,933 | A | * | 11/1971 | Staats | 156/552 |
| 4,090,911 | A | * | 5/1978 | Shaffer | 156/499 |
| 4,885,048 | A | * | 12/1989 | Sumi et al. | 156/552 |
| 6,159,334 | A | * | 12/2000 | Uno | 156/583.5 |
| 6,244,322 | B1 | * | 6/2001 | Paque | 156/555 |

* cited by examiner

*Primary Examiner*—James Sells
(74) *Attorney, Agent, or Firm*—Lowe Hauptman & Berner, LLP

(57) ABSTRACT

This invention discloses a laminated product automatic transporting and feeding device for laminator, including plural resilient tabs provided to a transporting conveyor of an automatic feeding device in parallel, the tabs retaining plural objects to be laminated that are individually placed in lamination pouch films in place, the transporting conveyor slowly feeding the laminated products retained by the resilient tabs into the laminator one by one so as to reduce time required for laminating plural laminated products.ocation towards the side so as to store the presser rod at its horizontal position.

3 Claims, 3 Drawing Sheets

LAMINATED PRODUCT AUTOMATIC TRANSPORTING AND FEEDING DEVICE FOR LAMINATOR

CROSS-REFERENCE TO RELATED APPLICATIONS

Not Applicable

STATEMENT REGARDING FEDERALLY SPONSORED RESEARCH OR DEVELOPMENT

Not Applicable

DESCRIPTION

1. Field of Invention

This invention relates to a laminator, particularly to a laminated product automatic transporting and feeding device, for feeding plural laminated products into a laminator by means of an automatic transporting one by one, so as to reduce time required for laminating plural laminated products.

2. Background

It is commonly known that laminators serve to seal and protect laminated products, such as photographs, important documents, and identifications, which are sandwiched in lamination pouch films. Thermal radiation is conducted to pressing rollers by heating elements of the laminator, were the rollers roll over laminated products to fuse the lamination pouch films.

The conventional laminating operation of laminators includes the steps of: placing a laminated product into a lamination pouch film, and feeding the lamination pouch film and the laminated product into an entrance of the laminator for lamination. For a laminated product of size A4, the time required for laminating such a product, depending on the rotating speed of the laminator, may take more than one minute from the preparatory step to completion. After laminating one laminated product, the same operation is performed to laminate the next laminated product. Accordingly, for lamination of plural laminated products, user would need to patiently stand by the laminator for the complete lamination of one laminated product, and then proceed to the lamination of the next laminated product. Such an operation requires significantly amount of time and efforts in order to complete lamination of all laminated products, which operation is most commonly seen in laminating photographs.

SUMMARY OF INVENTION

It is thus a primary object of this invention to provide a laminated product automatic transporting and feeding device for laminator, where plural laminated products may be retained to an automatic transporting device in advance, such that the laminated products may be automatically fed into the laminator for the lamination, so as to reduce the time required for laminating plural laminated products one by one.

It is another object of this invention to provide a laminated product automatic transporting and feeding device for laminator, where after commencing lamination of the plural laminated products that are retained to the transporting device in advance, the user, in principle, does not need to stand by the laminator to monitor the operation but can attend other businesses.

To achieve the above objects and overcome the drawbacks of the conventional art, this invention provides a laminated product automatic transporting and feeding device for laminator, including plural resilient tabs provided to a transporting conveyor of an automatic feeding device in parallel, the tabs retaining plural objects to be laminated that are individually placed in lamination pouch films in place, the transporting conveyor slowly feeding the laminated products retained by the resilient tabs into the laminator one by one so as to reduce time required for laminating plural laminated products.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

Figure 3:
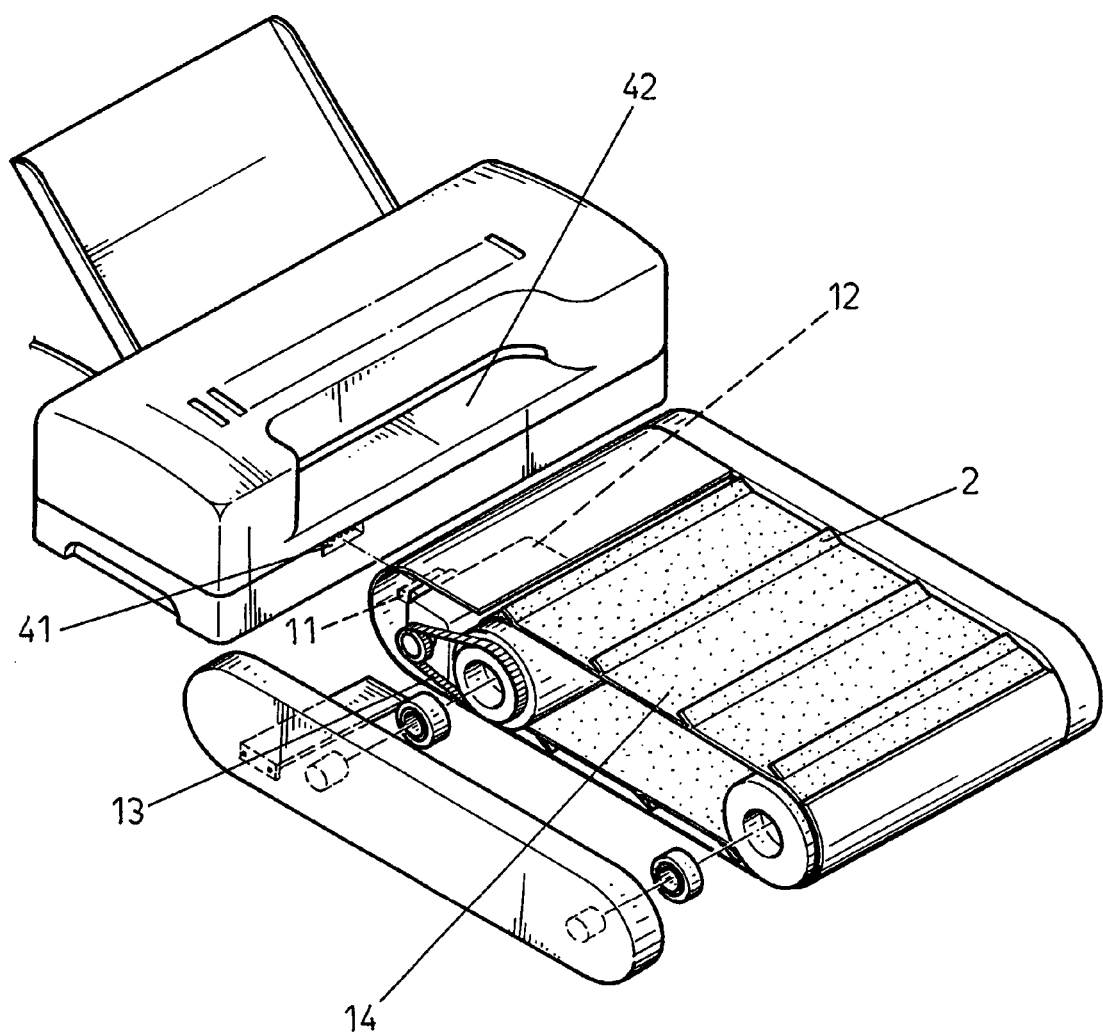
Figure 4:
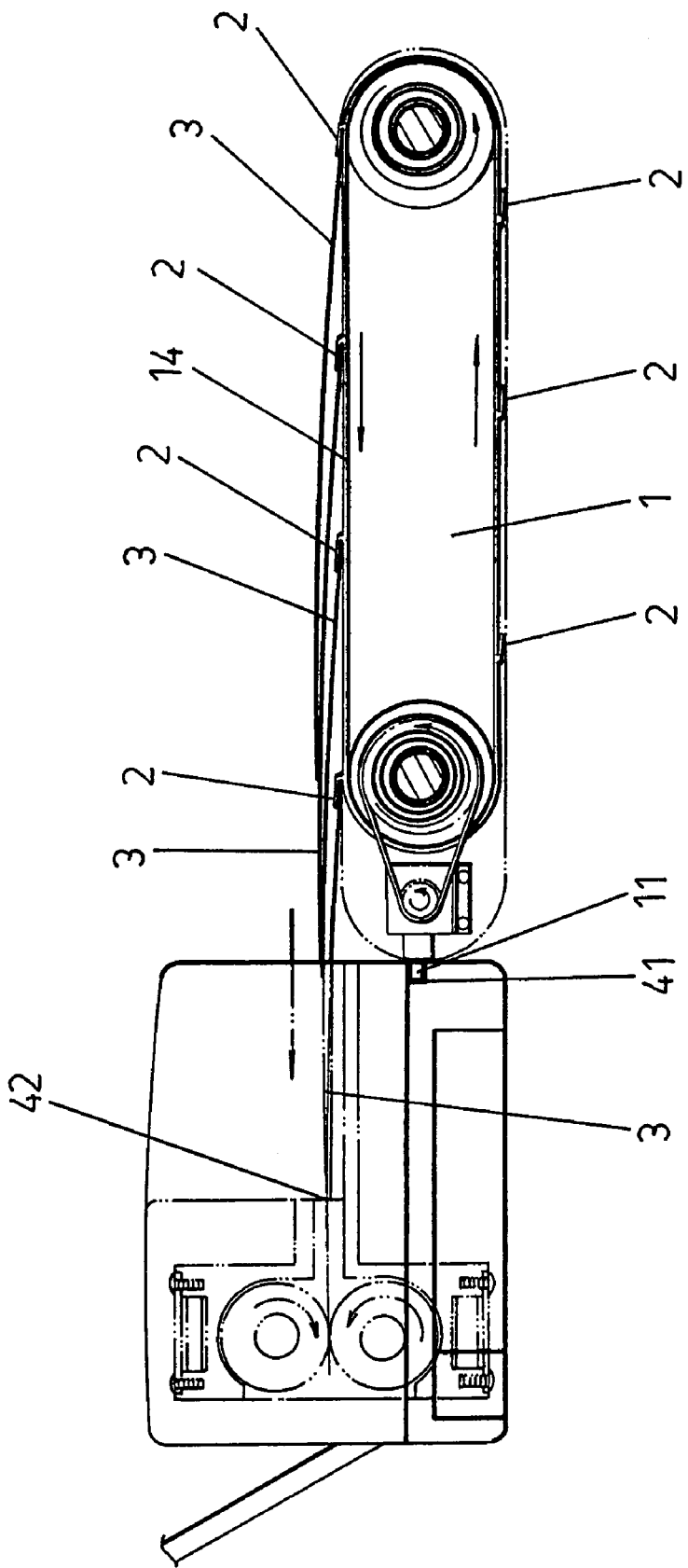

is a schematic view illustrating the process of placing a laminated product in a lamination pouch film;

FIG. 3 is a schematic view illustrating the structure of the automatic transporting and feeding device of this invention; and FIG. 4 is a schematic view illustrated an embodiment of the automatic transporting and feeding device of this invention.

DETAILED DESCRIPTION OF THE INVENTION (PREFERRED EMBODIMENTS)

Figure 1:
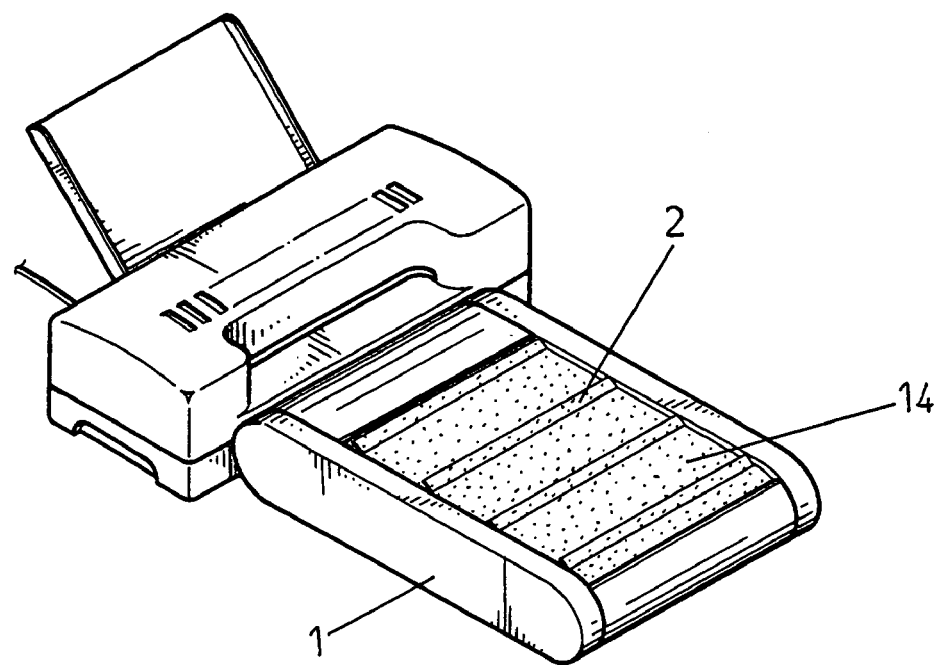
FIG. 1 is a schematic view illustrating the automatic transporting and feeding device of this invention being implemented along with a laminator.
Figure 2:
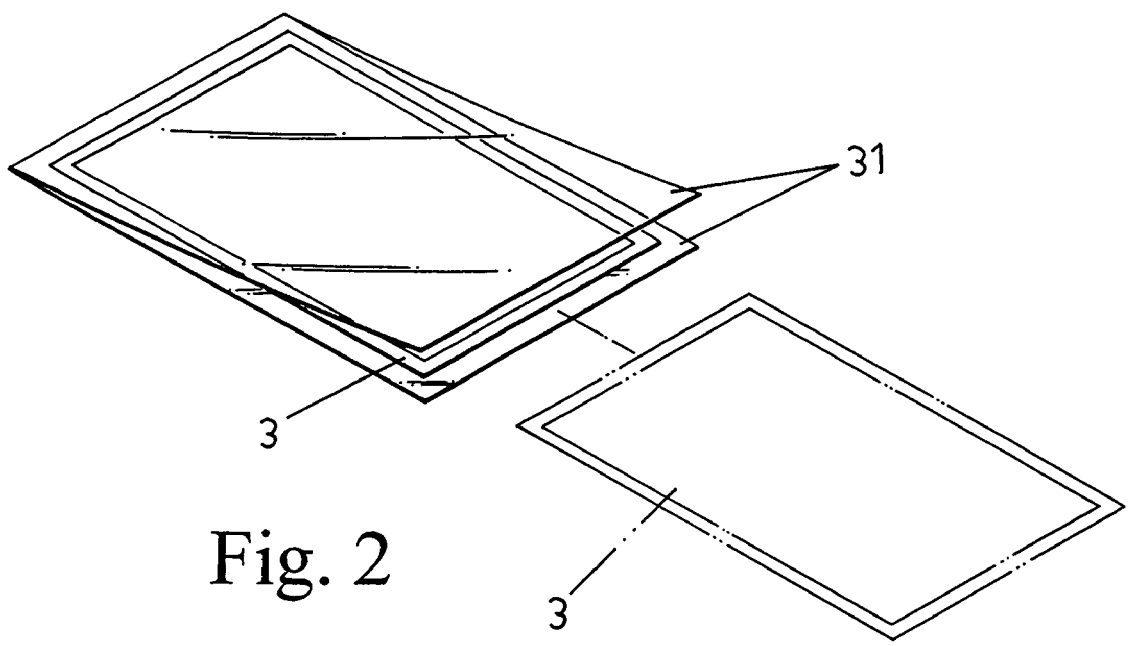

FIG. 1 is a schematic view illustrating the automatic transporting and feeding device of this invention being implemented along with a laminator; FIG. 2 is a schematic view illustrating the process of placing a laminated product in a lamination pouch film; FIG. 3 is a schematic view illustrating the structure of the automatic transporting and feeding device of this invention; and FIG. 4 is a schematic view illustrated an embodiment of the automatic transporting and feeding device of this invention. The power source of the automatic feeding device 1 of this invention can be actively supplied by an independent power line (not shown) or passively provided AC power supplied by a motor 12, after plugging an electrical plug 11 into a connecting port 41 provided to a front edge of the laminator. Reduction gear set (not shown) is then used to drive operation of a transporting conveyor 14 by means of conventional transmission driving components, such as a conveying belt 13 or gears. This invention is characterized in that, the transporting conveyor 14 includes plural resilient tabs 2 arranged in parallel. Any resilient tab 2 is able to retain a laminated product 3 placed in a lamination pouch film 31 to the transporting conveyor 14 in place, such that the plural laminated products 3 may be individually retained to the resilient tabs 2 and arranged over the transporting conveyor in sequence.

After the leading laminated product enters the laminator entrance 42 for lamination, a transporting conveyor 14 that rotates at a speed lower than that of the laminator 4 would slowly advancing the remaining laminated products forwards, such that at the same time the leading laminated product has completed lamination, its subsequent laminated products are able to enter the laminator entrance 4 for lamination one by one. Accordingly, the plural laminated products may be feed into the laminator by means of the transporting device one by one for lamination. Accordingly, this invention significantly reduces the time required by the conventional process, where the user must stand by to monitor the laminator for the complete lamination of one laminated product, and then proceed to the lamination of the next laminated product.

As is understood by a person skilled in the art, the foregoing preferred embodiment of the present invention is illustration of the present invention rather than limiting of the present invention. It is intended that various modifications and similar arrangements be included within the spirit and scope of the appended claims, the scope of which should be accorded the broadest interpretation so as to encompass all such modifications and similar structure.

LIST OF REFERENCE NUMERALS

1 automatic feeding device
11 electrical plug
12 motor
13 conveying belt
14 transporting conveyor
2 resilient tabs
3 laminated product
31 lamination pouch film
41 laminator connecting port
42 laminator entrance

What is claimed is:

1. A laminating assembly comprising:
   a laminator including an entrance to receive products to be laminated;
   an automatic feeding device coupled to the laminator including a transporting conveyer having a width, the transporting conveyer configured to convey the product to the entrance for the lamination by the laminator wherein, the transporting conveyer including a plurality of resilient tabs arranged in parallel across the width of the conveyer to retain the products to be laminated while conveyed to the entrance, wherein:
   the products are delivered by the conveyer to the entrance one by one by the resilient tabs at a speed based on the time needed by the laminator to complete lamination of one product; and
   the conveyer has a direction of conveying and the resilient tabs extending from the conveyer have an inner angle acute to the direction of conveying.

2. The assembly as claimed in claim 1 wherein the resilient tabs are arranged to retain the products to be laminated in an overlapping configuration while resting on the conveyer where a portion of one product rests on a portion of another product in the direction of conveying and the uncovered portion of the one product enters the entrance to be individually laminated.

3. The assembly of claim 1 wherein the resilient tabs are configured to retain the products individually in lamination pouch films.

* * * * *